(12) United States Patent
Jeon et al.

(10) Patent No.: US 10,620,473 B2
(45) Date of Patent: Apr. 14, 2020

(54) DISPLAY DEVICE

(71) Applicant: LG Display Co., Ltd., Seoul (KR)

(72) Inventors: Se-Hwan Jeon, Busan (KR);
Keum-Young Oh, Gyeongsangbuk-do
(KR); Ji-Soon Oh, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/160,725

(22) Filed: Oct. 15, 2018

(65) Prior Publication Data
US 2019/0121197 A1 Apr. 25, 2019

(30) Foreign Application Priority Data

Oct. 19, 2017 (KR) .................. 10-2017-0135772
Dec. 20, 2017 (KR) .................. 10-2017-0176119

(51) Int. Cl.
| G04G 9/00 | (2006.01) |
| G02F 1/1335 | (2006.01) |
| G04G 17/04 | (2006.01) |
| G04C 17/00 | (2006.01) |
| F21V 8/00 | (2006.01) |

(52) U.S. Cl.
CPC ..... *G02F 1/133553* (2013.01); *G02B 6/0031* (2013.01); *G02B 6/0068* (2013.01); *G02F 1/133603* (2013.01); *G04C 17/0091* (2013.01); *G04G 9/0041* (2013.01); *G04G 9/0094* (2013.01); *G04G 17/045* (2013.01); *G02F 2201/56* (2013.01)

(58) Field of Classification Search
CPC ........ G04G 9/00; G04G 17/00; G04G 9/0041; G04G 9/0094
See application file for complete search history.

(56) References Cited

U.S. PATENT DOCUMENTS 10,151,943 B2 12/2018 Ahn et al.
2003/0112712 A1* 6/2003 Ferri .................... G04B 19/042
368/238

(Continued)

FOREIGN PATENT DOCUMENTS

| CN | 102121670 A | 7/2011 |
| GB | 2544898 A | 5/2017 |
| TW | 201728976 A | 8/2017 |

OTHER PUBLICATIONS

The Intellectual Property Office of the United Kingdom, Combined Search and Examination Report under Sections 17 and 18(3), GB Application No. 1817035.7, dated Apr. 18, 2019, seven pages.

(Continued)

*Primary Examiner* — Paisley L Wilson
*Assistant Examiner* — Mariam Qureshi
(74) *Attorney, Agent, or Firm* — Fenwick & West LLP (57) ABSTRACT

A display device is configured such that a through-hole extends through a liquid crystal panel and a light guide plate, a fastener for coupling the hands of a watch is coupled to the through-hole, and the formation of a dark region is prevented due to interference between the fastener and light from a light source around the through-hole. At least one flat side surface for minimizing interference with the light from the light source is provided on the fastener, whereby uniform luminance is provided around the through-hole.

17 Claims, 9 Drawing Sheets

(56) References Cited

U.S. PATENT DOCUMENTS

2006/0126443 A1* 6/2006 Kuo .................. G04C 17/00
  368/232
2014/0293141 A1* 10/2014 Tsubokura ........ G02F 1/133308
  349/1
2017/0153486 A1   6/2017 Ahn et al.

OTHER PUBLICATIONS

Taiwan Intellectual Property Office, Office Action, TW Patent Application No. 107136974, dated Sep. 23, 2019, 12 pages.

* cited by examiner

DISPLAY DEVICE

CROSS-REFERENCE TO RELATED APPLICATIONS

This application claims the benefit of Republic of Korea Patent Application No. 10-2017-0135772, filed on Oct. 19, 2017, and Republic of Korea Patent Application No. 10-2017-0176119, filed on Dec. 20, 2017, which are both hereby incorporated by reference as if fully set forth herein.

BACKGROUND

Field

The present disclosure relates to a display device configured such that a through-hole, to which rotatable hands of a watch are coupled, is provided in the center of a liquid crystal panel.

Discussion of the Related Art

Recently, in the information-oriented society, the importance of display devices as visual information transmission media has been further emphasized. In order to occupy important positions in the future, requirements such as low power consumption, slimness, reduction in weight, and high image quality must be satisfied.

Display devices may be classified into self-emissive display devices, such as a cathode ray tube (CRT) display device, an electro luminescence (EL) display device, a light-emitting diode (LED) display, a vacuum fluorescent display (VFD) device, a field emission display (FED) device, and a plasma display panel (PDP), and non-emissive display devices, such as a liquid crystal display (LCD) device.

The liquid crystal display device, which is a device that displays images using optical anisotropy of liquid crystals, has attracted attention, since the liquid crystal display device exhibits higher visibility, lower power consumption, and dissipation of a smaller amount of heat than a cathode ray tube display device that is the same size as the liquid crystal display device.

In the liquid crystal display device, a data signal based on image information is individually supplied to pixels arranged in a matrix form in order to adjust the optical transmittance of the pixels, whereby a desired image is displayed.

To this end, the liquid crystal display device includes a liquid crystal panel, in which pixels are arranged in a matrix form, a driving unit for driving the pixels, and a backlight unit for supplying light to the liquid crystal panel.

Figure 1:
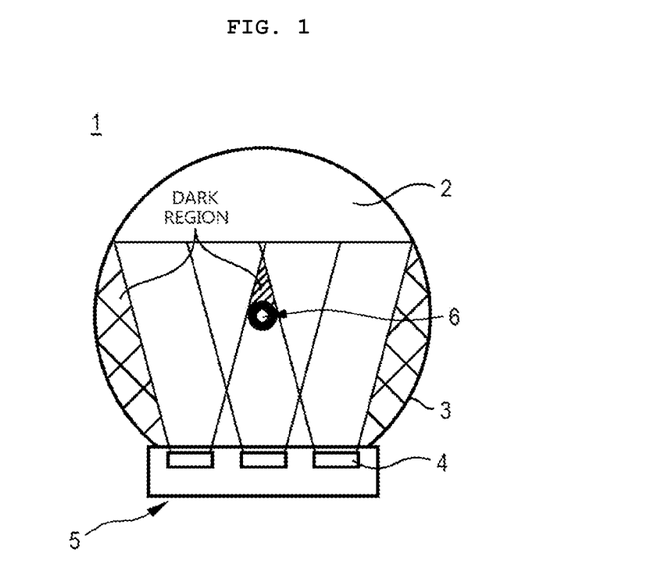
FIG. 1 is a reference view schematically showing the structure of a general liquid crystal display device.
Figure 2:
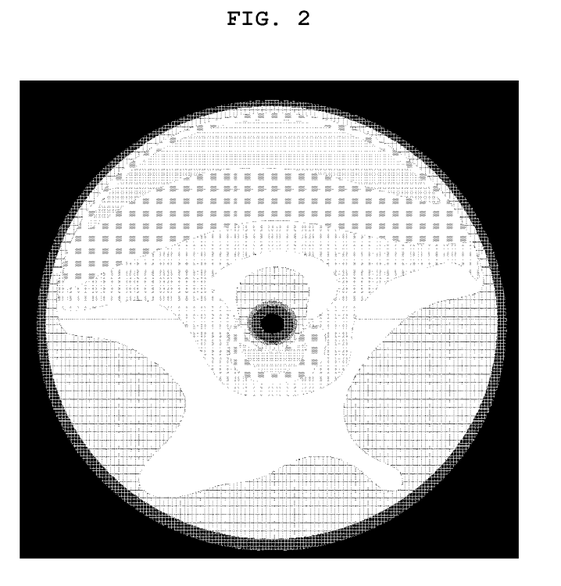
FIG. 2 is a reference view showing apparent luminance when the liquid crystal display device of FIG. 1 is driven.

FIG. 1 is a reference view schematically showing the structure of a conventional liquid crystal display device, and FIG. 2 is a reference view showing apparent luminance when the liquid crystal display device of FIG. 1 is driven.

Referring to FIG. 1, a conventional liquid crystal display device 1 includes a liquid crystal panel 2, in which pixels are arranged in a matrix form in order to output an image, a driving unit (not shown) for driving the pixels, and a backlight unit 5 having a light guide plate 3 and a light source 4 disposed at the rear of the liquid crystal panel 2 for emitting light over the entire surface of the liquid crystal panel 2.

The liquid crystal panel 2 generally includes a color filter substrate and an array substrate, which are laminated so as to be opposite each other such that a uniform cell gap is maintained therebetween, and a liquid crystal layer formed in the cell gap between the color filter substrate and the array substrate. Upper and lower polarization plates are attached to the outer surfaces of the liquid crystal panel 2. The lower polarization plate polarizes light that has passed through the backlight unit 5, and the upper polarization plate polarizes light that has passed through the liquid crystal panel 2.

A display device that is different from a conventional rectangular display device, such as a circular display device, is called a free-form display device. The term "free-form" means that objects have properties, appearances, or forms that are different from conventional properties, appearances, or forms. That is, a free-form display device is a display having a form different from the form of a conventional rectangular display device, such as a circular display device or a diamond-shaped display device.

The process of manufacturing a free-form display device is important, since the free-form display device is manufactured so as to have various forms, unlike a conventional rectangular display device. In addition, there is needed a very thin bezel, which is trendier and slimmer and satisfies user convenience more than conventional products.

With the recent increasing utilization of display devices, it is necessary to develop a display device suitable for the field to which the display device is applied. For example, it is necessary to consider the case in which at least one through-hole 6, through which a physical button or the hands of a watch, such as the hour hand, the minute hand, and the second hand of a watch, is provided in a screen region of the display device.

In this case, however, as shown in FIG. 2, the difference in luminance between the front and the rear of the through-hole 6 is great. Furthermore, a nonuniform difference in luminance occurs between a portion that is directly exposed to light from a light source and a portion that is not exposed to the light.

In order to solve the above problems, LED modules, which are further included in the backlight unit of FIG. 1, may be disposed at opposite sides thereof. In this case, however, the size of the bezel is increased.

SUMMARY

In various embodiments, the present disclosure provides a display device including a liquid crystal display panel formed with a first through-hole; a light guide plate configured to provide back light to the liquid crystal panel, the light guide plate formed with a second through-hole, the second through-hole is aligned with the first through-hole; a plurality of light sources configured to radiate light, the plurality of light sources positioned along a side of the light guide plate, the light guide plate configured to direct the light from the plurality of light sources towards an upper side of the light guide plate facing the liquid crystal panel; and a fastener including a body that is at least partially transparent and a head, a cross-section of the body being smaller than the second through-hole and a cross-section of the head being larger than the second through-hole, the fastener formed with a longitudinal hole penetrating the body and the head, the body inserted into the second through-hole to transmit a portion of the light from the plurality of light sources through the body of the fastener.

The body of the fastener may have at least one flat side surface. An air gap may be between an inner surface of the second through-hole and the at least one flat side surface of the fastener. The portion of light from the plurality of light sources may be transmitted through the air gap.

The body of the fastener may include a first flat side surface and a second flat side surface that is adjacent to the first flat side surface. The body of the fastener may further include at least one reflector on the at least one flat side surface, the at least one reflector made of a same material as the body of the fastener or a reflecting material. The at least one reflector may have a cross-section of a curved shape across a plane parallel to the upper side of the light guide plate.

The fastener may include a first flat side surface, a second flat side surface, and a third flat side surface connecting the first flat side surface and the second flat side surface.

The second through-hole may have at least one flat side surface matching the at least one flat side surface of the body of the fastener.

The fastener may include a first flat side surface, a second flat side surface, and a curved surface connecting the first flat side surface and the second flat side surface.

The body of the fastener may include a light-incident side surface to which the portion of the light is incident upon, and a light-exit side surface through which the portion of light exits. The light-incident side surface and the light-exit side surface may be closer to an inner surface of the second through-hole than remaining side surfaces of the body of the fastener.

The body of the fastener may have a circular portion, a first protrusion with the light-incident side surface at one side of the body and a second protrusion with the light-exit side surface at an opposite side of the body.

The body of the fastener may have a semi-circular portion, a first protrusion with the light-incident side surface at one side of the body and a second protrusion with the light-exit side surface at an opposite side of the body.

The body of the fastener may include another light-exit side surface adjacent to the light-exit side surface that is closer to the light-exit side surface than the light-incident side surface.

In various embodiments, the present disclosure provides a display device including a liquid crystal panel formed with a first through-hole, a light guide plate configured to provide back light to a liquid crystal panel, the light guide plate formed with a second through-hole with at least one first flat side surface; a plurality of light sources configured to radiate light, the plurality of light sources positioned along a side of the light guide plate; and a transparent fastener having at least one second flat side surface that matches the at least one first flat side surface, wherein the transparent fastener is inserted into the second through-hole and the light from the plurality of light sources is transmitted through the transparent fastener.

The display device may further include at least one reflector on the at least one flat side surface.

The display device may further include an air gap between the at least one flat side surface and an inner surface of the second through-hole.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Hereinafter, exemplary embodiments of an organic light-emitting display device according to the present disclosure will be described in detail with reference to the accompanying drawings so that the present disclosure will be easily realized by those skilled in the art. In the drawings, the same elements are denoted by the same reference numerals even when they are depicted in different drawings. In the following description of the present disclosure, a detailed description of known functions and configurations incorporated herein will be omitted when the same may obscure the subject matter of the present disclosure. Those skilled in the art will appreciate that some features in the drawings may be exaggerated, reduced, or simplified for ease of description thereof, and that drawings and elements thereof are not always shown at the accurate scale.

Figure 3:
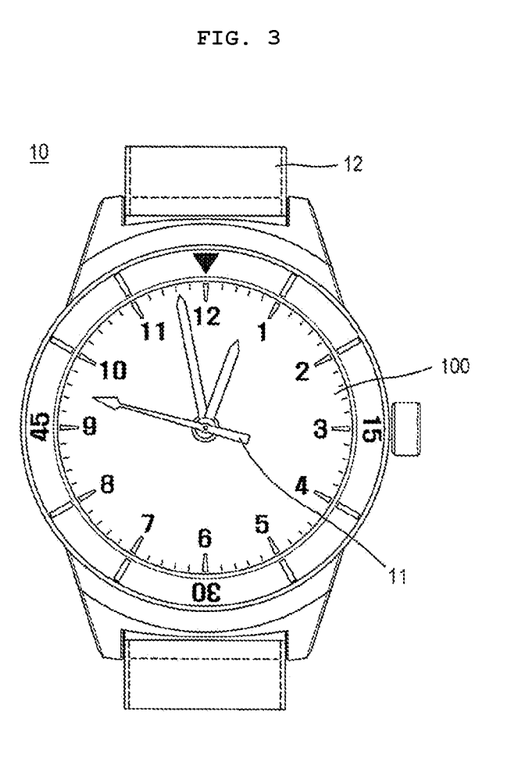
FIG. 3 is a front view showing a handheld terminal provided with a display device according to a first embodiment of the present disclosure.

FIG. 3 is a front view showing a handheld terminal provided with a display device according to a first embodiment of the present disclosure.

Referring to FIG. 3, a wearable watch will be described as an example of a handheld terminal 10. Of course, the present disclosure may be applied to a mobile/portable terminal or a stationary terminal. In addition, the present disclosure may be applied to a vehicle-mount terminal, which is a type of mobile/portable terminal. A vehicle speedometer or a dashboard indicating revolutions per minute (RPM) may be used as the vehicle-mount terminal.

The handheld terminal 10 is provided in the center thereof with a through-hole 111 (see FIG. 4), through which the hands 11 of a watch, such as the hour hand, the minute hand, and the second hand of a watch, are coupled so as to be rotatable on a liquid crystal panel 110. In addition, a fastener (e.g., fastening unit 140 see FIG. 4) is coupled to the through-hole 111 in order to guide the coupling of the hands 11 of the watch. The fastening unit 140 may include a body that is at least partially transparent and a head.

Furthermore, a holding means 12, such as a band or a chain, is provided such that the handheld terminal 10 is put on the wrist of a user.

Figure 4:
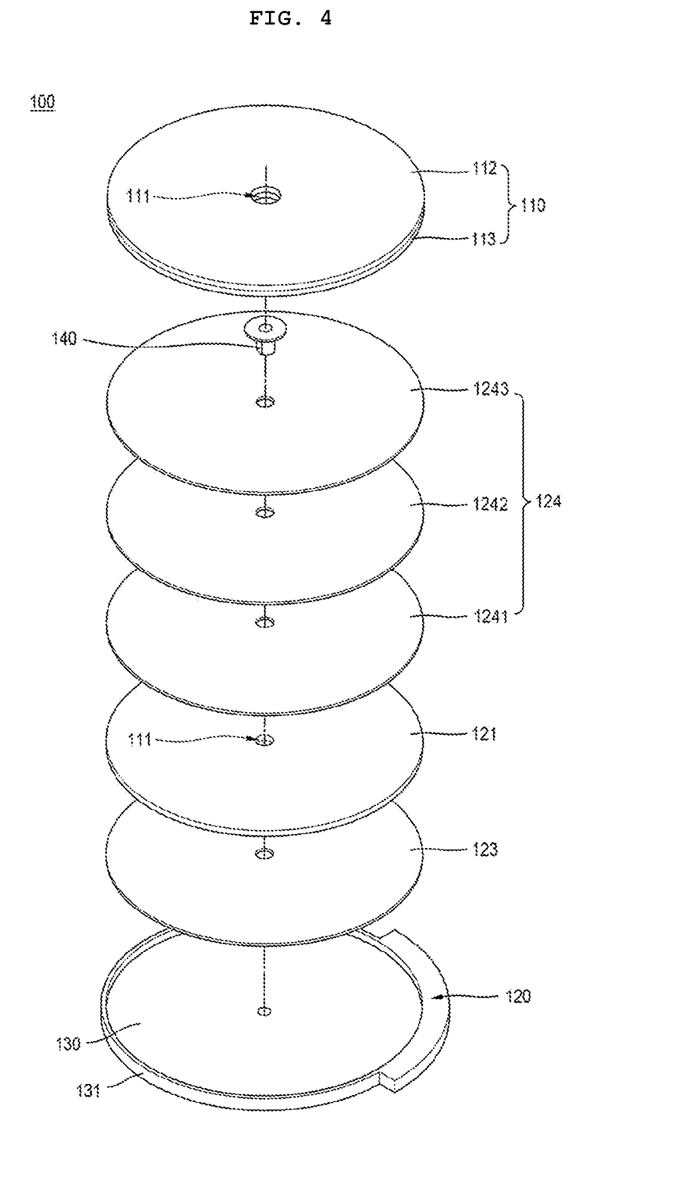
FIG. 4 is an exploded perspective view of the display device shown in FIG. 3.
Figure 5:
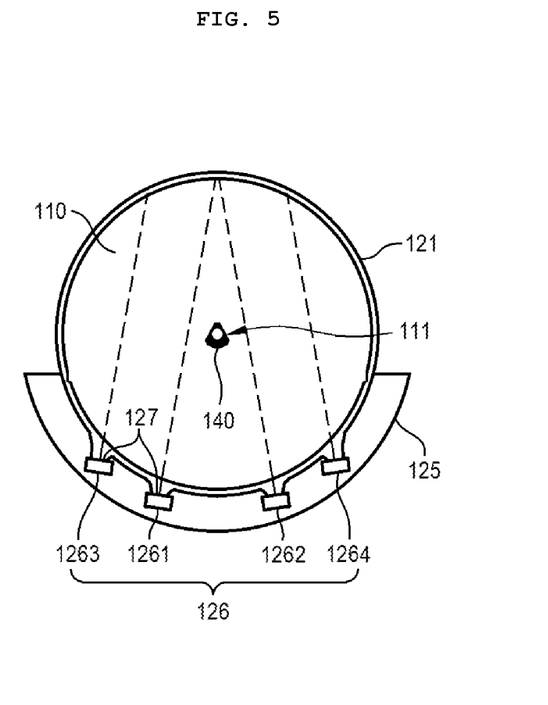
FIG. 5 is a reference view showing the state in which the display device shown in FIG. 4 is driven.

FIG. 4 is an exploded perspective view of the display device shown in FIG. 3, and FIG. 5 is a reference view showing the state in which the display device shown in FIG. 4 is driven.

Referring to FIGS. 4 and 5, a display device 100 according to a first embodiment of the present disclosure includes a liquid crystal panel 110, a backlight unit 120, a housing 130 for accommodating the liquid crystal panel 110 and the backlight unit 120, and a fastening unit 140 coupled to a through-hole 111, which is formed through the liquid crystal panel 110 and a light guide plate 121. The through-hole in the liquid crystal panel 110 may be referred to as a first through-hole, and the through-hole in the light guide plate 121 may be referred to as a second through-hole. The second through-hole is aligned to the first through-hole.

The liquid crystal panel 110, in which pixels are arranged in a matrix form in order to output an image, includes a color filter substrate 112 and an array substrate 113, which are laminated so as to be opposite each other such that a uniform cell gap is maintained therebetween, and a liquid crystal layer (not shown) formed in the cell gap between the color filter substrate 112 and the array substrate 113.

The backlight unit 120 includes a light guide plate 121 disposed under the liquid crystal panel 110, an LED module provided with a plurality of light sources 126 disposed at one side of the light guide plate 121 for emitting light, and a reflection plate 123 provided on the rear surface of the light guide plate 121. The LED module of the backlight unit 120 is disposed at one side of the housing 130.

A plurality of optical sheets 124, for improving the efficiency of emission of light from the light guide plate 121 so as to be radiated to the liquid crystal panel 110, is provided on the upper surface of the light guide plate 121. However, the present disclosure is not limited thereto. Any kind of backlight unit 120 may be applied to the display device 100 according to the present disclosure.

The light guide plate 121 guides light emitted from the light sources 126 toward the liquid crystal panel 110. The light guide plate 121 may be made of plastic, such as PMMA or PC.

The reflection plate 123 is located between the housing 130 and the rear surface of the light guide plate 121. The reflection plate 123 reflects light emitted from the light sources 126 and light reflected by the light guide plate 121 toward the liquid crystal panel 110. Light emitted from the light sources 126 is incident on the side surface of the light guide plate 121, which is made of a transparent material. The reflection plate 123, disposed on the rear surface of the light guide plate 121, reflects light transmitted to the rear surface of the light guide plate 121 toward the optical sheets 124, disposed on the upper surface of the light guide plate 121, in order to reduce the loss of light and to improve uniformity of luminance.

The optical sheets 124 may include a diffusion sheet 1241 and a prism sheet 1242, and may further include a luminance improvement film 1243, such as DBEF, and a protection sheet (not shown). The optical sheets 124 may be provided between the upper surface of the light guide plate 121 and the rear surface of the liquid crystal panel 110. The backlight unit 120 having the above structure is accommodated in the housing 130.

The housing 130 may include a side part 131 extending from the bottom in the vertical direction. The side part 131 vertically extends from the edge of the housing 130 so as to have a predetermined height. A plurality of side parts may be provided.

The through-hole 111 is formed through the centers of the liquid crystal panel 110, the optical sheets 124, the light guide plate 121, the reflection plate 123, and the housing 130. The fastening unit 140 is coupled to the through-hole 111. The through-hole 111 is formed through at least the liquid crystal panel 110 and the light guide plate 121.

When the fastening unit 140 is coupled to the through-hole 111, the coupling positions of the liquid crystal panel 110, the optical sheets 124, the light guide plate 121, and the reflection plate 123 or the housing 130 are fixed. When at least one surface of the fastening unit 140 is flat, luminance around the through-hole 111 becomes uniform. The at least one flat surface of the fastening unit 140 may be on a body of the fastening unit 140. A cross-section of the body of the fastening unit 140 may be smaller than the second through-hole, and a cross section of the head may be larger than the second through-hole. The body of the fastener may inserted into the second through-hole.

Referring to FIG. 5, an LED module 125 having a plurality of light sources 126 is disposed at one side of the light guide plate 121. The light sources 126 are disposed only at one side of the light guide plate 121. Consequently, the size of a bezel (not shown) is reduced more than in the case in which LED modules 125 are disposed at opposite sides of the light guide plate 121.

The light sources 126 radiate light from one side of the light guide plate 121 toward the other side of the light guide plate 121. The LED module 125 includes a first light source 1261, disposed at the left side of the through-hole 111, a second light source 1262, disposed at the right side of the through-hole 111, a third light source 1263, disposed at the left side of the first light source 1261, and a fourth light source 1264, disposed at the right side of the second light source 1262.

The first light source 1261 and the second light source 1262 radiate light toward a single set point on the middle of the other side of the light guide plate 121. The third light source 1263 radiates light so as to be parallel to the light radiated from the first light source 1261, and the fourth light source 1264 radiates light so as to be parallel to the light radiated from the second light source 1262. Consequently, the light-exit surfaces 127 of the first light source 1261 and the third light source 1263 are disposed at the same angle, and the light-exit surfaces 127 of the second light source 1262 and the fourth light source 1264 are disposed at the same angle. As a result, the first light source 1261 to the fourth light source 1264 are disposed so as to uniformly radiate light from one side of the light guide plate 121, whereby uniform luminance is realized. Consequently, image quality becomes uniform without deviation.

In the example shown in FIG. 5, one side of the light guide plate 121 is curved, and the first light source 1261 to the fourth light source 1264 are arranged along the curvature of the light guide plate 121. Alternatively, the LED module 125 and the light guide plate 121 may be flat, and the light-exit surfaces 127 may be disposed at the same angle, i.e. so as to be parallel to each other. In this case, although not shown, the effect of luminance uniformity achieved by improving the shape of the fastening unit 140, a description of which will follow, may be almost the same.

In another example, one side of the light guide plate 121 may be curved, and the first light source 1261 to the fourth light source 1264 may be arranged along a curvature different from the curvature of the light guide plate 121. In this case, an additional structure (not shown) identical or similar to the light guide plate 121 may be further provided to compensate for the curvature of the light guide plate 121 and the curvature along which the light sources 126 are arranged.

Figure 6:
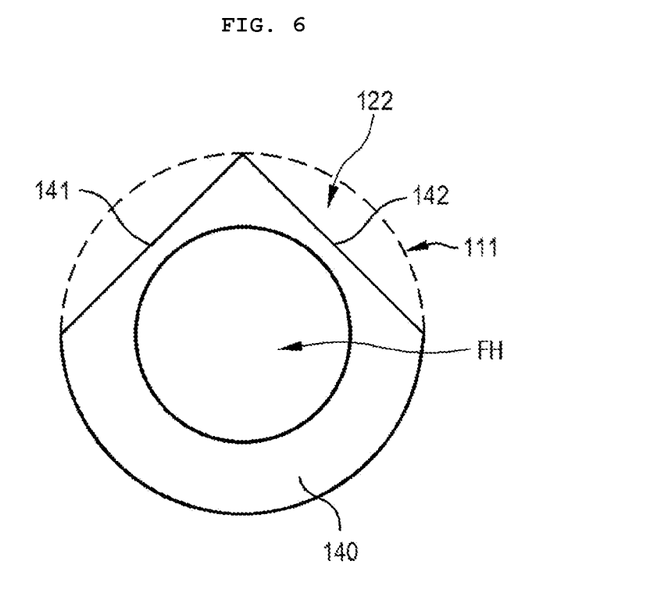
FIGS. 6 and 7 are reference views showing a fastening unit of the display device shown in FIG. 5.
Figure 7:
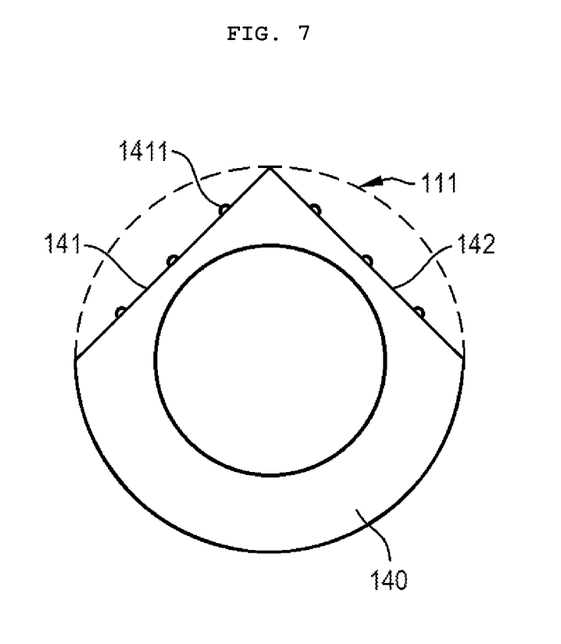
Figure 8:
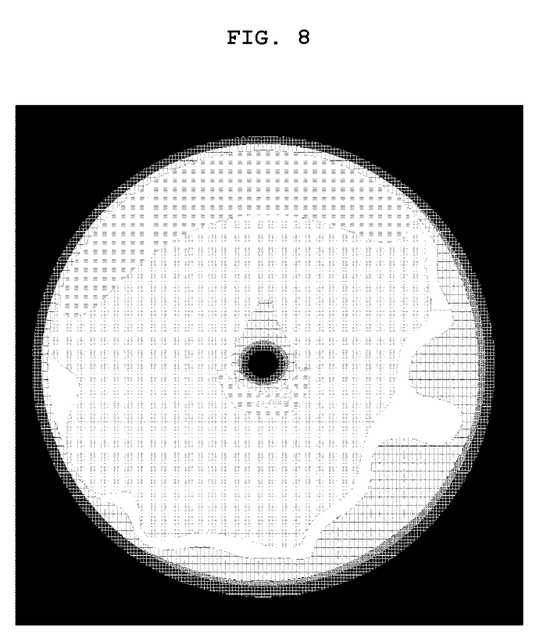
FIG. 8 is a reference view showing the luminance of the display device shown in FIG. 5.

FIGS. 6 and 7 are reference views showing the fastening unit of the display device shown in FIG. 5, and FIG. 8 is a reference view showing the luminance of the display device shown in FIG. 5.

Referring to FIG. 6, the fastening unit 140 of the display device according to the first embodiment of the present disclosure is formed in an approximately hollow cylindrical shape, which is inserted into the through-hole 111 so as to be coupled to the through-hole 111. A hole (FH), to which the hands 11 (see FIG. 3) of the watch are coupled, is formed in the fastening unit 140. The hole (FH) may be a longitudinal hole formed through the fastening unit 140. The fastening unit 140 may be made of a transparent material, like the light guide plate 121, in order to reduce interference with light around the through-hole 111. The fastening unit 140 may be made of a partially transparent material.

The fastening unit 140 is provided with at least one flat surface (e.g., flat side surface) that faces the other side of the light guide plate 121. The flat surface may be formed on a body of the fastening unit 140. The flat surface may be formed by cutting a portion of the thickness of the fastening unit 140. The flat surface may be formed with a removed portion of the thickness of the fastening unit 140. Light from the light sources 126 is reflected or transmitted through the cut or removed portion, whereby luminance around the through-hole 111 is improved. An air gap may be between an inner surface of the second through-hole and the at least one flat side surface of the fastening unit 140.

The fastening unit 140 includes a first flat surface 141 (e.g., first flat side surface) and a second flat surface 142 (e.g., second flat side surface), which are adjacent to each other. The first flat surface 141 and the second flat surface 142 are formed such that the thickness (e.g., cross sectional area, volume) of the fastening unit 140 is reduced within the range in which the shape of the fastening unit 140 is maintained. When the first flat surface 141 and the second flat surface 142 are provided at the fastening unit 140, an empty space 122 or air gap is formed between the fastening unit 140 and the through-hole 111. When the empty space 122 is formed, a density difference depending on material occurs between the fastening unit 140 and the light guide plate 121, or a light spark phenomenon occurs depending on the angular difference between the fastening unit 140 and the light guide plate 121, whereby luminance around the through-hole 111 is improved.

As shown in FIG. 7, at least one reflector (e.g., reflection member 1411) is provided on the first flat surface 141 and the second flat surface 142. The reflection member 1411 may be made of the same material as the fastening unit 140, and may be formed integrally with the fastening unit 140. Alternatively, the reflection member 1411 may be made of a material exhibiting high reflectance, and may be coupled to the fastening unit 140. The reflection member 1411 also reflects light around the through-hole 111 in order to improve the luminance of the region around the through-hole 111. The reflection members 1411 may be arranged so as to have various patterns, or a relatively large number of reflection members 1411 may be located at the connection between the first flat surface 141 and the second flat surface 142.

The reflection member 1411 may be formed in an approximately hemispherical shape. The reflection member 1411 may have a cross-section of a curved shape across a plane parallel to the upper side of the light guide plate 121. A flat, concave, or convex reflective surface for reflecting light from the light sources 126 toward the liquid crystal panel 110 may be formed on one surface of the reflection member 1411. In addition, a reflective pattern (not shown), such as a mirror, for improving reflectance of light may be provided on the reflective surface of the reflection member 1411.

As a result, as shown in FIG. 8, the size of a dark region around the through-hole 111 is remarkably reduced, and luminance is improved at approximately 3 to 5 o'clock positions and approximately 7 to 9 o'clock positions. Consequently, the display device according to the present disclosure exhibits more uniform luminance than a conventional display device, the luminance of which is intensively high at approximately 10 to 2 o'clock positions.

Figure 9:
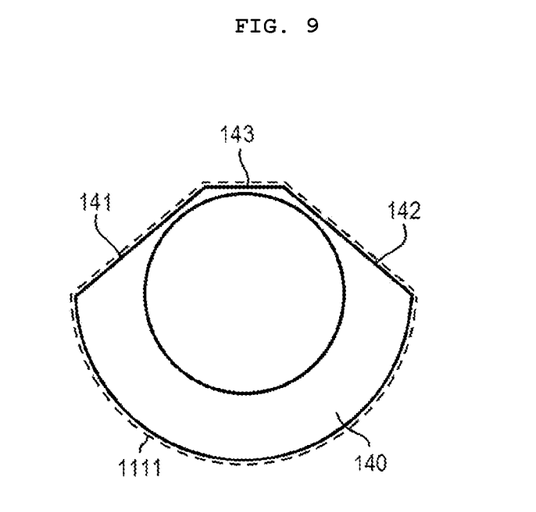
FIGS. 9 and 10 are sectional views showing another embodiment of the fastening unit of the display device shown in FIG. 5.
Figure 10:
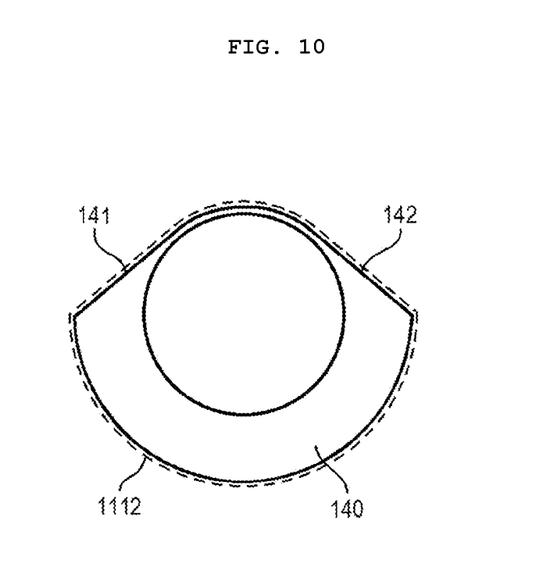

FIGS. 9 and 10 are sectional views showing another embodiment of the fastening unit of the display device shown in FIG. 5.

Referring first to FIG. 9, the fastening unit includes a first flat surface 141, a second flat surface 142, and a third flat surface 143 provided at a portion at which the first flat surface 141 and the second flat surface 142 are adjacent to each other. The third flat surface 143 connects the first flat surface 141 and the second flat surface 142.

When the first flat surface 141 to the third flat surface 143 are provided, as described above, the thickness of (e.g., cross sectional area, volume of) a through-hole 1111 that is adjacent to the upper part of the through-hole 111, i.e. the other side of the light guide plate, is reduced, whereby interference between the fastening unit and light from the light sources is further reduced in the direction in which the light advances. Consequently, the size of a dark region may be reduced, whereby uniformity of luminance may be further improved.

If the thickness of the upper part of the fastening unit 140 is excessively reduced, the coupling position of the fastening unit 140 in the through-hole 1111 may not be properly fixed. The through-hole 1111 is formed so as to have a shape corresponding to at least one of the first flat surface 141 to the third flat surface 143 of the fastening unit 140. That is, the through-hole 1111 is formed as a hole having a partially flat surface therein, rather than a simple cylindrical hole, whereby the coupling position of the fastening unit 140 in the through-hole 1111 is fixed. The second through-hole in the light guide plate may have at least one flat side surface matching the at least one flat side surface of the body of the fastening unit 140. Of course, when the shape of the through-hole 1111 and the shape of the outer circumferential surface of the fastening unit 140 are formed to be the same, as shown in FIG. 9, it is possible to improve luminance due to a change in the shape of the fastening unit 140 and to fix the fastening unit 140 in the through-hole 1111.

Referring to FIG. 10, the fastening unit includes a first flat surface 141, a second flat surface 142, and a curved surface provided at a portion at which the first flat surface 141 and the second flat surface 142 are adjacent to each other. The curved surface connects the first flat surface 141 and the second flat surface 142. In FIG. 10, the thickness of the upper part of the fastening unit 140 is reduced more than that of the fastening unit 140 of FIG. 9 in order to fundamentally realize the functions of the fastening unit 140. In addition, the outer circumferential surface of the upper part of the fastening unit 140 and the inner circumferential surface of a through-hole 1112 are curved, whereby interference between the fastening unit and light from the light sources is reduced in the direction in which the light advances. Consequently, luminance may be further improved.

In the display device according to the present disclosure described above, interference between the fastening unit coupled in the through-hole and light from the light sources is reduced in the direction in which the light advances, whereby the size of a dark region around the through-hole is reduced. In addition, uniform luminance is provided over the liquid crystal panel 110 by improving the structure in which the light sources of the backlight unit 120 are arranged. Furthermore, the LED module is disposed only at one side of the liquid crystal panel 110 under the liquid crystal panel 110, whereby the size of the bezel is further reduced while image quality is improved more than in the case in which the LED modules are provided at opposite sides of the liquid crystal panel.

Figure 11:
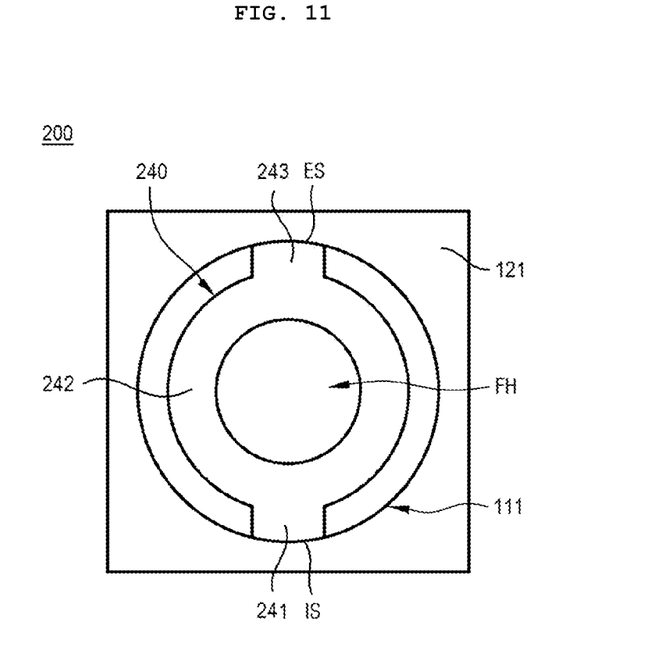
FIG. 11 is a sectional view showing a fastening unit of a handheld terminal provided with a display device according to a second embodiment of the present disclosure.
Figure 12:
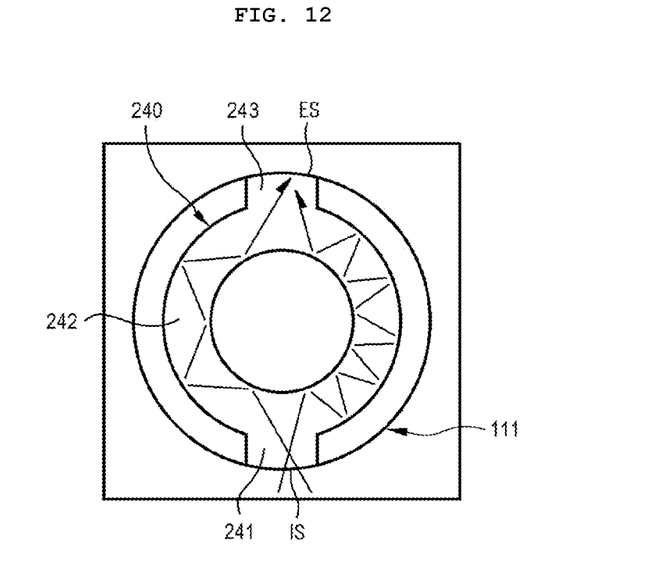
FIG. 12 is a reference view showing an optical path in the fastening unit of the display device shown in FIG. 11.
Figure 13:
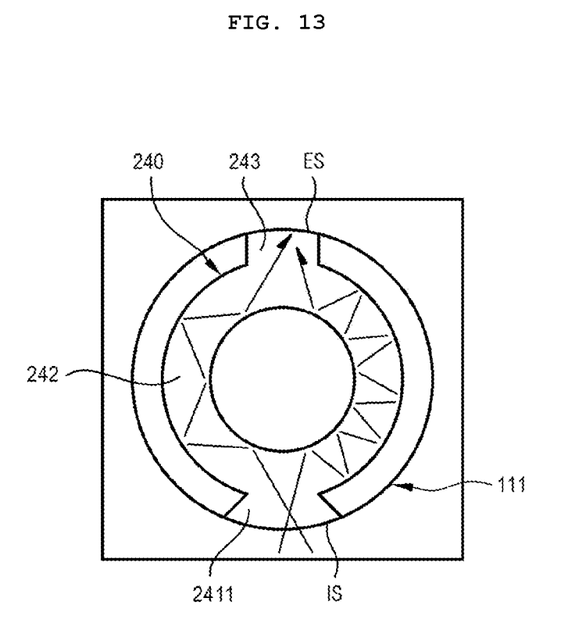
FIG. 13 is a reference view showing a modification of a light-incident member of the fastening unit shown in FIG. 12.

FIG. 11 is a sectional view showing a fastening unit of a handheld terminal provided with a display device according to a second embodiment of the present disclosure, FIG. 12 is a reference view showing an optical path in the fastening unit of the display device shown in FIG. 11, and FIG. 13 is a reference view showing a modification of a light-incident member of the fastening unit shown in FIG. 12.

Referring to FIGS. 11 to 13, a fastener (e.g., fastening unit 240) of a display device 200 according to a second embodiment of the present disclosure is formed in an approximately hollow cylindrical shape, which is inserted into a through-hole 111 so as to be coupled to the through-hole 111. A hole (FH) for realizing an additional function is formed in the fastening unit 240. The hole (FH) may be a longitudinal hole formed through the fastening unit 240. The hole (FH) may be used to couple the hands of a watch, a camera module, a flash module, or a sensor, such as a proximity sensor or an illuminance sensor, into the through-hole 111. The fastening unit 240 may include a body that is at least partially transparent and a head.

The fastening unit 240 includes a light-incident member 241 for introducing light from a light source into the through-hole 111, a reflection member 242 for reflecting the light introduced by the light-incident member 241 toward a dark region, and a light-exit member 243 for emitting light from the reflection member 242 toward the dark region. The fastening unit 240 includes a light-incident side surface (IS) to which a portion of the light is incident upon, and a light-exit side surface (ES) through which the portion of light exits. The light-incident surface (IS) and the light-exit surface (ES) are closer to an inner surface of the through-hole 111 (e.g., second through-hole) than remaining surfaces of the body of the fastening unit 240. The fastening unit 240 may have a circular portion, a first protrusion with the light-incident side surface at one side of the body and a second protrusion with the light-exit side surface at an opposite side of the fastening unit 240.

The light-incident member 241 is disposed on the through-hole 111 so as to face the light source. As previously described, the fastening unit 240 is made of a material identical or similar to the material of the light guide plate 121, whereby light may be effectively moved or reflected. The fastening unit 240 may be made of a transparent material, like the light guide plate 121. The fastening unit 240 may be made of a partially transparent material. Consequently, the light-incident member 241 has a function of transmitting light emitted from the light source to the reflection member 242.

In addition, as shown in FIG. 13, the angle of the portion of a light-incident member 2411 that contacts the through-hole 111 may be increased such that a larger amount of light can be introduced through the light-incident member 2411. Of course, the angle of the portion of the light-exit member 243 that contacts the through-hole 111 may be increased such that a larger amount of light can be emitted toward the dark region.

The light-incident member 241 or 2411 and the light-exit member 243 may be coupled to the inner circumferential surface of the through-hole 111 so as to come into contact therewith. Consequently, the light guide plate 121 and the fastening unit 240 are in contact with each other, whereby the reflection or absorption of light thereat is reduced.

One section of the reflection member 242 is circular to match the shape of the through-hole 111. The outer circumferential surface of the reflection member 242 is spaced apart from the inner circumferential surface of the through-hole 111 by a predetermined distance. As shown in FIG. 12, therefore, light introduced into the light-incident member 241 is repeatedly reflected along the reflection member 242, and is emitted toward the dark region through the light-exit member 243.

Alternatively, the reflection member 242 may be formed in a shape different from the shape of the through-hole 111. For example, the through-hole 111 may be circular, and one section of the reflection member 242 may be quadrangular, oval, or polygonal.

Figure 14:
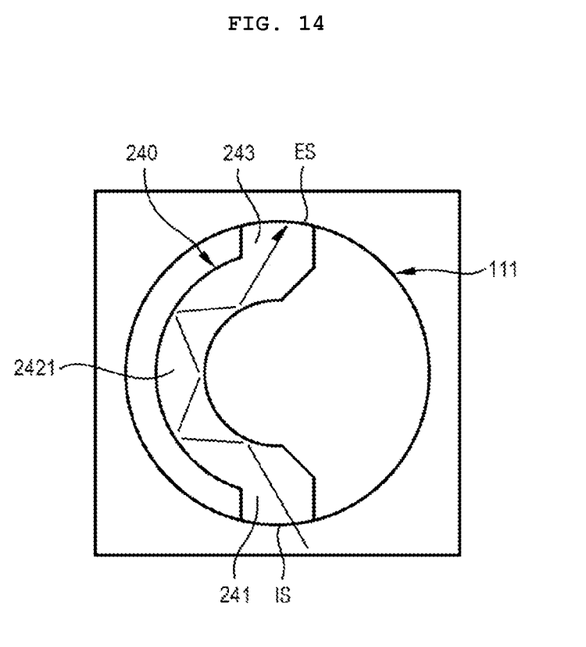
FIG. 14 is a reference view showing an embodiment in which only half of a reflection member of the fastening unit shown in FIG. 12 is provided.

FIG. 14 is a reference view showing an embodiment in which only half of the reflection member of the fastener (e.g., fastening unit) shown in FIG. 12 is provided.

Referring to FIG. 14, a reflection member 2421 is provided only at one side of the through-hole 111. In the previous embodiment, the reflection member 242 is connected to the light-incident member 241 and the light-exit member 243 at opposite sides thereof from the through-hole 111. In this embodiment, however, light may be transmitted to a dark region through the reflection member 2421, which has a size equivalent to half the size of the reflection member 242, whereby image quality may be improved. The fastening unit 240 in this embodiment has a semi-circular portion, a first protrusion with the light-incident side surface at one side of the body and a second protrusion with the light-exit side surface at an opposite side of the body.

In the case in which the size of a component that is inserted into the through-hole 111 together with the fastening unit 240, such as a camera module, is large, the half-sized reflection member 2421 may be used without increasing the size of the through-hole 111. In addition, the half-sized reflection member 2421, which reflects or transmits a smaller amount of light, may be used in a region in which a contrast ratio of the dark region is relatively low.

Figure 15:
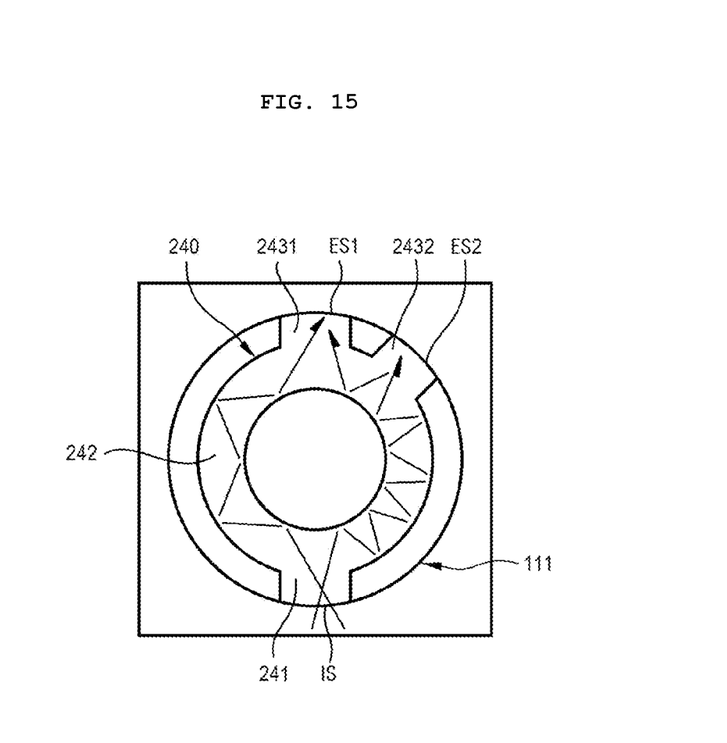
FIG. 15 is a reference view showing an embodiment in which the fastening unit shown in FIG. 12 includes a plurality of light-exit members.

FIG. 15 is a reference view showing an embodiment in which the fastener (e.g., fastening unit) shown in FIG. 12 includes a plurality of light-exit members. The body of the fastening unit 240 may include another light-exit side surface (ES2) adjacent to the light-exit side surface (ES1) that is closer to the light-exit side surface than the light-incident side surface (IS).

A light-exit member 2431 emits light reflected by the reflection member 242 toward a dark region in order to improve image quality in the dark region.

A plurality of light-exit members 2431 and 2432 may be provided on the reflection member 242 depending on the position of the dark region. Of course, a plurality of light-incident members 241 may be provided on the reflection member 242 depending on the position or direction of a light source.

When the light-exit members 2431 and 2432 are provided, as described above, it is possible to cover a wider dark region through a single fastening unit 240. Consequently, it is not necessary to provide an additional light source, whereby it is possible to manufacture a slimmer and thinner display device.

In the display device according to the present disclosure described above, the fastening unit coupled into the through-hole reflects light from the light source and transmits the reflected light to a dark region. Consequently, it is possible to improve the quality of an image around the through-hole and to transmit light irrespective of the direction of the light source depending on the size or position of the dark region.

As is apparent from the above description, the display device according to the present disclosure has the following effects.

First, interference between the fastening unit, which is coupled into the through-hole formed in the liquid crystal panel and the light guide plate, and light from the light sources in the direction in which the light advances is reduced, whereby it is possible to reduce the size of a dark region around the through-hole.

Second, it is possible to provide uniform luminance over the liquid crystal panel by improving the structure in which the light sources of the backlight unit are arranged.

Third, the LED module is disposed only at one side of the liquid crystal panel under the liquid crystal panel, whereby the size of the bezel is further reduced while image quality is improved more than in the case in which the LED modules are provided at opposite sides of the liquid crystal panel.

Fourth, the fastening unit reflects light from the light sources therein and directly transmits the reflected light to a dark region, whereby it is possible to transmit light irrespective of the size or position of the dark region.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A display device comprising:
   a liquid crystal display panel formed with a first through-hole;
   a light guide plate configured to provide back light to the liquid crystal panel, the light guide plate formed with a second through-hole, the second through-hole is aligned with the first through-hole;
   a plurality of light sources configured to radiate light, the plurality of light sources positioned along a side of the light guide plate, the light guide plate configured to direct the light from the plurality of light sources towards an upper surface of the light guide plate facing the liquid crystal panel; and
   a fastener including a body that is at least partially transparent and a head, a cross-section of the body being smaller than the second through-hole and a cross-section of the head being larger than the second through-hole, the fastener formed with a longitudinal hole penetrating the body and the head, the body inserted into the second through-hole to transmit a portion of the light from the plurality of light sources through the body of the fastener,
   wherein the body of the fastener has at least one flat planar side surface.

2. The display device of claim 1, wherein an air gap is between an inner surface of the second through-hole and the at least one flat planar side surface of the fastener.

3. The display device of claim 2, wherein the portion of light from the plurality of light sources is transmitted through the air gap.

4. The display device of claim 1, wherein the body of the fastener includes a first flat planar side surface and a second flat planar side surface that is adjacent to the first flat planar side surface.

5. The display device of claim 1, wherein the body of the fastener further includes at least one reflector on the at least one flat planar side surface, the at least one reflector made of a same material as the body of the fastener or a reflecting material.

6. The display device of claim 5, wherein the at least one reflector has a cross-section of a curved shape across a plane parallel to the upper surface of the light guide plate.

7. The display device of claim 1, wherein the fastener includes a first flat planar side surface, a second flat planar side surface, and a third flat planar side surface connecting the first flat planar side surface and the second flat planar side surface.

8. The display device of claim 1, wherein the second through-hole has at least one flat planar side surface matching the at least one flat planar side surface of the body of the fastener.

9. The display device of claim 1, wherein the fastener includes a first flat planar side surface, a second flat planar side surface, and a curved surface connecting the first flat planar side surface and the second flat planar side surface.

10. The display device of claim 1, wherein the body of the fastener includes a light-incident side surface to which the portion of the light is incident upon, and a light-exit side surface through which the portion of light exits.

11. The display device of claim 10, wherein the light-incident side surface and the light-exit side surface are closer to an inner surface of the second through-hole than remaining side surfaces of the body of the fastener.

12. The display device of claim 11, the body of the fastener has a circular portion, a first protrusion with the light-incident side surface at one side of the body and a second protrusion with the light-exit side surface at an opposite side of the body.

13. The display device of claim 11, wherein the body of the fastener has a semi-circular portion, a first protrusion with the light-incident side surface at one side of the body and a second protrusion with the light-exit side surface at an opposite side of the body.

14. The display device of claim 11, wherein the body of the fastener includes another light-exit side surface adjacent to the light-exit side surface that is closer to the light-exit side surface than the light-incident side surface.

15. A display device comprising:
    a liquid crystal panel formed with a first through-hole,
    a light guide plate configured to provide back light to the liquid crystal panel, the light guide plate formed with a second through-hole, the second through-hole with at least one first flat planar side surface;
    a plurality of light sources configured to radiate light, the plurality of light sources positioned along a side of the light guide plate; and
    a transparent fastener having at least one second flat planar side surface that matches the at least one first flat planar side surface, wherein the transparent fastener is inserted into the second through-hole and the light from the plurality of light sources is transmitted through the transparent fastener, wherein a body of the transparent fastener has at least one flat planar side surface.

16. The display device of claim 15, further comprising at least one reflector on the at least one flat planar side surface.

17. The display device of claim 15, further comprising an air gap between the at least one flat planar side surface and an inner surface of the second through-hole.

* * * * *